June 16, 1964
T. E. KIRK
3,137,811
SEMICONDUCTOR VOLTAGE REGULATOR
Filed Aug. 6, 1962
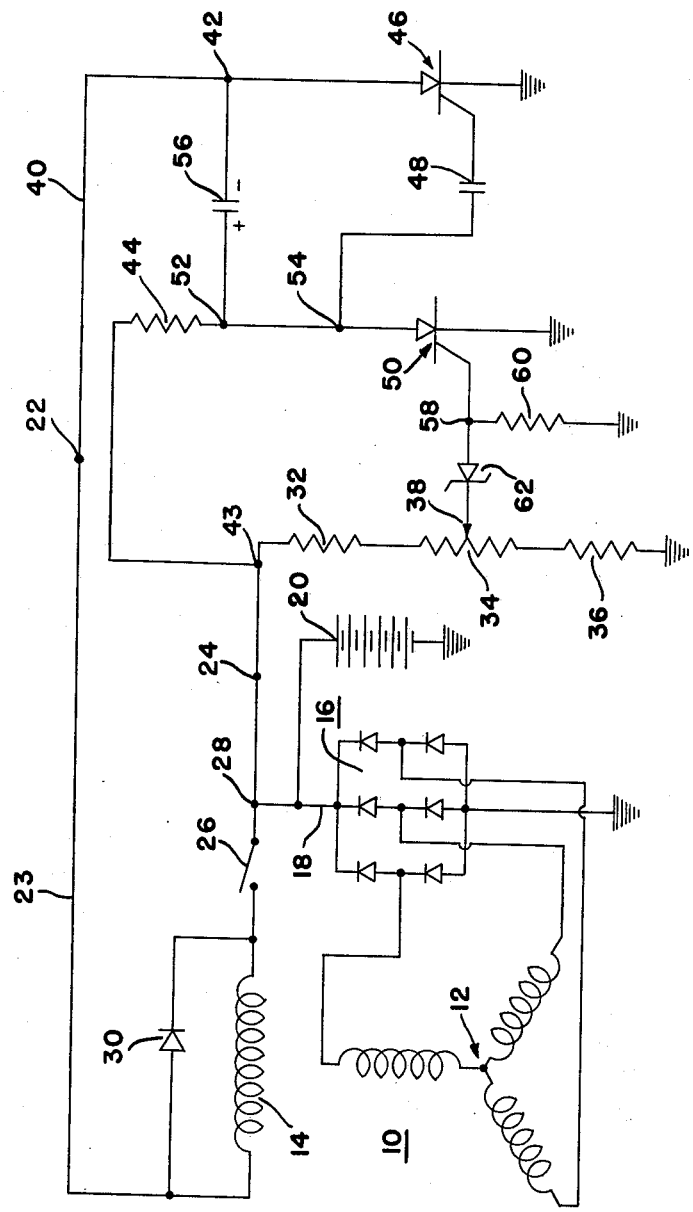
INVENTOR.
Thomas E. Kirk
BY C. R. Meland
His Attorney United States Patent Office 3,137,811
Patented June 16, 1964

3,137,811
SEMICONDUCTOR VOLTAGE REGULATOR
Thomas E. Kirk, Anderson, Ind., assignor to General Motors Corporation, Detroit, Mich., a corporation of Delaware
Filed Aug. 6, 1962, Ser. No. 215,188
10 Claims. (Cl. 322—73)

This invention relates to semiconductor voltage regulators and more particularly to a semiconductor voltage regulator which can be used to control the output voltage of a generator.

In motor vehicle electrical systems it has been common practice in the past to use a D.C. generator for supplying charging current to a battery and current to the other D.C. loads on the motor vehicle. The most widely used regulator for this type system has been a three-unit regulator which includes a cutout relay, a current regulating relay and a voltage regulating relay. These relays all have contacts, some of which vibrate and therefore were subject to failure by destruction of the vibrating contacts due to arcing and burning and due to their constant vibration.

With development of alternating current generators and semiconductor diodes, the cutout relay has been eliminated since the semiconductor diodes can be used to prevent the battery from discharging through the generator. In some instances this A.C. system has been used with a transistor regulator which also eliminates the vibrating contact voltage regulator to provide a completely static system. A system of this type is shown in the Short Patent Re. 24,715.

In contrast to the above noted electrical systems for motor vehicles, it is an object of this invention to provide a voltage regulator which makes use of a silicon controlled rectifier for controlling the field current of the generator. The controlled rectifier can be used as a switch and little power is dissipated in switching from "off" to "on." In addition, the controlled rectifier can be operated in a higher ambient temperature as compared to a transistor.

Another object of this invention is to provide a voltage regulator which is operative to control the field current of a generator and which includes a pair of controlled rectifiers, one of which is connected with a voltage sensing circuit and the other being connected to control generator field current.

A further object of this invention is to provide a regulator for a generator or the like which has a pair of controlled rectifiers and a pair of capacitors which are respectively used to turn the controlled rectifier on and off.

Further objects and advantages of the present invention will be apparent from the following description, reference being had to the accompanying drawing wherein a preferred embodiment of the present invention is clearly shown.

In the drawing, the single figure drawing is a schematic circuit diagram of a voltage regulator made in accordance with this invention and connected to control the field current of a generator.

Referring now to the drawing, the reference numeral 10 designates an alternating current generator which has a three phase Y-connected output winding 12 and a field winding 14. The field winding 14 may be driven by the engine on a motor vehicle and provides magnetic flux for causing an A.C. voltage to be generated in the output winding 12. The output winding 12 may be the stator winding of the generator.

The phase windings of the output winding 12 are connected with the A.C. input terminals of a three phase full wave bridge rectifier network generally designated by reference numeral 16. This bridge rectifier network comprises six PN junction semiconductor diodes which may be of the silicon type. One of the D.C. output terminals of the bridge rectifier 16 is grounded whereas the other D.C. output terminal is connected with a lead wire 18. The lead wire 18 feeds charging current to the D.C. loads on the motor vehicle including the battery 20.

The voltage regulator of this invention has a field terminal 22, a positive terminal 24 and a grounded terminal depicted by the ground symbols on the circuit diagram. The field terminal 22 is connected to one side of the field winding 14 by a conductor 23. The opposite side of the field winding is connected with a manually operable switch 26 which in turn is connected with lead wire 18 at the junction 28. A silicon diode 30 is connected across the field winding 14 and operates as a transient voltage suppressing diode.

The positive terminal 24 of the voltage regulator is connected with junction 28 and is also connected to one side of a voltage dividing network which is comprised of resistors 32, 34 and 36. The opposite side of the voltage dividing network is grounded and it is seen that the resistor 34 is a variable resistor having a shiftable tap 38.

The field terminal 22 of the voltage regulator is connected with lead wire 40. The lead wire 40 is connected to junction 42 and in series with a controlled rectifier 46. A resistor 44 is connected between junctions 43 and 52. The controlled rectifier 46 is of a type which will conduct between its anode and cathode electrodes whenever the gate electrode is positive with respect to the cathode. In order to turn this controlled rectifier off, however, it is necessary either to break the circuit to the anode-cathode circuit or else apply a voltage to the cathode which is positive with respect to the anode. It is seen that the anode of controlled rectifier 46 is connected with junction 42 and is in series with the lead wire 40. The cathode of controlled rectifier 46 is grounded and the gate electrode of controlled rectifier 46 is connected to one side of a capacitor 48.

The voltage regulator has another controlled rectifier 50 which is a low current capacity controlled rectifier. If sufficient gate signal is applied to this controlled rectifier, it will conduct and remain in conduction so long as a gate signal is present. This controlled rectifier can be turned off by removing the gate signal from the gate electrode providing that the anode current is limited to a value which is less than the holding current and this current limiting is accomplished by the resistor 44.

The anode of controlled rectifier 50 is connected with junctions 52 and 54. The junction 54 is connected to one side of capacitor 48. Another capacitor 56 connects the junctions 42 and 52 and this capacitor has a larger capacity than capacitor 48.

The cathode of controlled rectifier 50 is grounded and the gate electrode of this controlled rectifier is connected with junction 58. A resistor 60 is connected between junction 58 and ground. A Zener diode 62 connects the shiftable tap 38 with the junction 58.

When the manually operable switch 26 is closed, the controlled rectifier 46 will be turned on in its anode-cathode circuit. At this time, the controlled rectifier 50 is turned off in its anode-cathode circuit since there is not a sufficient voltage appearing between junction 24 and ground to break down the Zener diode 62 in a reverse direction. The controlled rectifier 46 is turned on by a pulse of voltage that is coupled through resistor 44 and capacitor 48. This circuit can be traced from junction 28, junction 24, junction 43, resistor 44, through capacitor 48 and then through the gate-cathode circuit of controlled rectifier 46. With controlled rectifier 46 turned on in its anode-cathode circuit, field current can flow through the field winding 14 to cause the generator 10 to build up. At this time, capacitor 56 is charged with the polarity shown through the anode-cathode circuit of controlled rectifier 46.

As the generator 10 builds up, the output voltage appearing between junction 24 and ground will reach a value which is high enough to cause a breakdown of the Zener diode 62. This voltage can be adjusted by shifting the tap 38 and will be the desired regulated voltage to be maintained by the voltage regulator. The Zener diode 62 is operated past its knee or reference voltage. In this mode of operation a small change in supply voltage will cause a large change in Zener current providing a sufficient change in voltage and current to the gate electrode of controlled rectifier 50 to turn it "on" or "off." When the supply voltage is too high, the voltage of junction 58 and the gate electrode of controlled rectifier 50 will increase and therefore will be higher than the grounded cathode of controlled rectifier 50. This will cause the controlled rectifier 50 to turn on in its anode-cathode circuit which connects the positive side of capacitor 56 essentially to ground. This will drive the cathode of controlled rectifier 46 positive with respect to its anode and the controlled rectifier 46 will therefore turn off in its anode-cathode circuit. When controlled rectifier 46 turns off, the field current for field winding 14 is interrupted and the output voltage appearing between junction 24 and ground will drop. As soon as this voltage drops, the potential of junction 58 drops. The controlled rectifier 50 will now turn off since the resistor 44 will limit the current in its anode-cathode circuit to a value which is less than the holding current for this type of controlled rectifier.

In the foregoing description, only one cycle of operation has been described, namely the turning on and the turning off of the controlled rectifier 46 as the voltage builds up and then drops. It will be appreciated that this cycle is repeated many times and at a rapid rate during operation of this system to turn on and turn off the field current for the generator 10. This results in an average field current which is sufficient to maintain a constant voltage between junction 24 and ground.

While the embodiment of the present invention as herein disclosed constitutes a preferred form, it is to be understood that other forms might be adopted.

What is claimed is as follows:

1. In combination, a generator having an output winding and a field winding, a controlled rectifier having anode, cathode and gate electrodes, an energizing circuit for said field winding connected with said output winding and including the anode-cathode circuit of said controlled rectifier, first and second capacitors, means connecting said first capacitor with said output winding and with the gate electrode of said controlled rectifier, a charging circuit for said second capacitor including the anode-cathode circuit of said controlled rectifier, and a voltage responsive discharging circuit for said second capacitor connected with said output winding and with the cathode-anode circuit of said controlled rectifier.

2. In combination, a generator having an output winding and a field winding, a two-terminal direct-current circuit energized from said output winding, a controlled rectifier having anode, cathode and gate electrodes, an energizing circuit for said field winding connected across said two-terminal direct-current circuit and including the anode-cathode circuit of said controlled rectifier, means for applying a turn-on signal to the gate electrode of said controlled rectifier including a first capacitor connected between the gate electrode of said controlled rectifier and one side of said two-terminal direct-current circuit, a second capacitor, a charging circuit for said second capacitor connected across said two-terminal direct-current circuit and including the anode-cathode circuit of said controlled rectifier, a voltage responsive circuit connected with said two-terminal direct-current circuit, and a discharging circuit for said second capacitor operable to turn off said controlled rectifier and including said voltage responsive circuit.

3. The combination according to claim 2 wherein the voltage responsive circuit includes a Zener diode.

4. The system according to claim 2 wherein the voltage responsive circuit includes a Zener diode and a second controlled rectifier.

5. A voltage regulator comprising, first and second controlled rectifiers each having gate, cathode and anode electrodes, first and second capacitors, means connecting said first capacitor between the anode electrodes of said controlled rectifiers, means connecting the second capacitor between the anode electrode of said second controlled rectifier and the gate electrode of said first controlled rectifier, and a voltage responsive circuit connected with the gate and cathode electrodes of said second controlled rectifier.

6. The voltage regulator according to claim 5 wherein the voltage responsive circuit includes a Zener diode.

7. The voltage regulator according to claim 5 wherein the voltage responsive circuit includes a Zener diode connected between a voltage dividing network and the gate electrode of the second controlled rectifier.

8. In combination, an alternating current generator having an output winding and a field winding, a three phase full-wave bridge rectifier network having A.C. input terminals connected with said output winding and having D.C. output terminals, a controlled rectifier having anode, cathode and gate electrodes, an energizing circuit for said field winding connected across said D.C. output terminals and including the anode-cathode circuit of said controlled rectifier, first and second capacitors, a turn-on circuit for said controlled rectifier including said first capacitor, a charging circuit for said second capacitor connected across said D.C. output terminals and including the anode-cathode circuit of said controlled rectifier, a discharging circuit for said second capacitor for turning off said controlled rectifier including a voltage responsive circuit, and means connecting said voltage responsive circuit across said D.C. output terminals.

9. The system according to claim 8 wherein the discharging circuit for said second capacitor includes the anode-cathode circuit of a second controlled rectifier.

10. The system according to claim 8 wherein the voltage responsive circuit includes a second controlled rectifier having a gate electrode connected with a Zener diode.

References Cited in the file of this patent
UNITED STATES PATENTS
3,040,270    Gutzwiller _____ June 19, 1962

OTHER REFERENCES

"Applications and Circuit Design Notes," Bulletin D420–02, September 1960, by Solid State Products, Inc.